US012217906B2

(12) United States Patent
Jung et al.

(10) Patent No.: US 12,217,906 B2
(45) Date of Patent: Feb. 4, 2025

(54) INDUCTIVE COMPONENT

(71) Applicant: EPCOS AG, Munich (DE)

(72) Inventors: Matthias Jung, Deining b. Egling (DE); Günter Feist, Gingen (DE)

(73) Assignee: TDK Electronics AG, Munich (DE)

( * ) Notice: Subject to any disclaimer, the term of this patent is extended or adjusted under 35 U.S.C. 154(b) by 530 days.

(21) Appl. No.: 17/201,263

(22) Filed: Mar. 15, 2021

(65) Prior Publication Data

US 2021/0202164 A1 Jul. 1, 2021

Related U.S. Application Data

(62) Division of application No. 15/521,565, filed as application No. PCT/EP2015/074130 on Oct. 19, 2015, now Pat. No. 10,978,242.

(30) Foreign Application Priority Data

Nov. 5, 2014 (DE) ........................ 102014116139.4

(51) Int. Cl.

*H01F 27/32* (2006.01)
*H01F 5/02* (2006.01)
*H01F 5/06* (2006.01)
*H01F 27/02* (2006.01)

(Continued)

(52) U.S. Cl.

CPC ............ *H01F 27/325* (2013.01); *H01F 5/02* (2013.01); *H01F 5/06* (2013.01); *H01F 27/02* (2013.01); *H01F 27/24* (2013.01); *H01F 27/327* (2013.01); *H01F 2005/022* (2013.01); *H01F 2005/025* (2013.01); *H01F 2005/043* (2013.01)

(58) Field of Classification Search

CPC ........ H01F 27/325; H01F 27/02; H01F 27/24; H01F 27/327
USPC .................................................. 336/221, 198
See application file for complete search history.

(56) References Cited

U.S. PATENT DOCUMENTS

| | | | |
|---|---|---|---|
| 3,851,287 | A | 11/1974 | Miller et al. |
| 3,909,761 | A | 9/1975 | Miles |
| 4,250,479 | A | 2/1981 | Bausch et al. |

(Continued)

FOREIGN PATENT DOCUMENTS

| | | | |
|---|---|---|---|
| CN | 102422366 | A | 4/2012 |
| CN | 103125004 | A | 5/2013 |

(Continued)

*Primary Examiner* — Shawki S Ismail
*Assistant Examiner* — Joselito S. Baisa
(74) *Attorney, Agent, or Firm* — Slater Matsil, LLP

(57) ABSTRACT

In an embodiment, an inductive component includes at least one electrical conductor, a coil former with a hollow-shaped winding former, on a surface of which the at least one electrical conductor is wound around the winding former, a magnetic core arranged in a first cavity of the winding former and a potting material, wherein the at least one electrical conductor is surrounded by the potting material, wherein the potting material has no directly adherent contact with the magnetic core, wherein the magnetic core comprises a first part-body and a second part-body, which are connected to one another, wherein at least one of the first part-body or the second part-body of the magnetic core comprises a leg arranged in the first cavity of the winding former and at least one further leg arranged outside the first cavity of the winding former.

15 Claims, 16 Drawing Sheets

(51) Int. Cl.
*H01F 27/24* (2006.01)
*H01F 5/04* (2006.01)

(56) References Cited

U.S. PATENT DOCUMENTS

| | | | | |
|---|---|---|---|---|
| 4,405,913 | A | 9/1983 | Finkbeiner | |
| 4,408,176 | A | 10/1983 | Nakamura | |
| 4,510,478 | A * | 4/1985 | Finkbeiner | H01F 27/306 336/208 |
| 4,586,016 | A | 4/1986 | Rilly et al. | |
| 4,716,394 | A * | 12/1987 | Gordon | H01F 27/325 336/198 |
| 4,857,878 | A * | 8/1989 | Eng, Jr. | H01F 27/306 336/198 |
| 4,985,984 | A | 1/1991 | Umezaki | |
| 5,034,854 | A * | 7/1991 | Matsumura | H01F 27/292 361/744 |
| 5,175,525 | A | 12/1992 | Smith | |
| 5,369,389 | A | 11/1994 | Schrammek et al. | |
| 5,670,925 | A | 9/1997 | Gibbs | |
| 5,726,616 | A * | 3/1998 | Bell | H01F 27/266 336/198 |
| 5,754,086 | A | 5/1998 | Ichida et al. | |
| 5,783,982 | A | 7/1998 | Lecheler | |
| 5,996,214 | A * | 12/1999 | Bell | H01F 27/266 29/605 |
| 6,181,230 | B1 | 1/2001 | Broome et al. | |
| 6,326,879 | B1 | 12/2001 | Hangmann et al. | |
| 7,038,570 | B2 | 5/2006 | McMichael et al. | |
| 7,199,694 | B2 | 4/2007 | Hao | |
| 7,202,767 | B2 * | 4/2007 | Maekawa | H01F 38/12 336/92 |
| 7,449,986 | B2 | 11/2008 | Yamaguchi et al. | |
| 7,724,115 | B2 | 5/2010 | Chen et al. | |
| 8,054,152 | B2 | 11/2011 | Tseng et al. | |
| 8,344,839 | B2 | 1/2013 | Faccin | |
| 8,598,973 | B2 | 12/2013 | Kawaguchi | |
| 8,854,169 | B2 * | 10/2014 | Frontczak | H01T 13/44 336/122 |
| 8,907,758 | B2 | 12/2014 | Nomura et al. | |
| 8,941,453 | B2 | 1/2015 | Yano et al. | |
| 9,196,442 | B2 | 11/2015 | Ito et al. | |
| 11,705,260 | B2 * | 7/2023 | Nakagawa | H01F 5/02 363/20 |
| 2003/0201868 | A1 | 10/2003 | McMichael et al. | |
| 2004/0178873 | A1 * | 9/2004 | Kohno | H01F 27/325 336/180 |
| 2008/0024262 | A1 * | 1/2008 | Chang | H01F 27/02 336/198 |
| 2010/0214049 | A1 * | 8/2010 | Park | H01F 27/325 336/170 |
| 2012/0068796 | A1 | 3/2012 | Santichen et al. | |
| 2012/0223799 | A1 | 9/2012 | Hester et al. | |
| 2013/0027173 | A1 | 1/2013 | Ohsawa | |
| 2013/0104863 | A1 | 5/2013 | Arroyo et al. | |
| 2013/0285776 | A1 | 10/2013 | Piascik et al. | |
| 2013/0328655 | A1 * | 12/2013 | Catalano | H05K 3/30 336/200 |
| 2014/0125440 | A1 | 5/2014 | Ueno et al. | |
| 2014/0160819 | A1 | 6/2014 | Inaba | |
| 2014/0218158 | A1 | 8/2014 | Miyamoto | |

FOREIGN PATENT DOCUMENTS

| | | | | |
|---|---|---|---|---|
| CN | 104051143 | A * | 9/2014 | H01F 27/2804 |
| DE | 1488339 | A1 | 4/1969 | |
| DE | 3109268 | A1 | 3/1982 | |
| DE | 3311775 | C1 | 6/1984 | |
| DE | 4340928 | A1 | 6/1995 | |
| DE | 19927820 | C1 | 7/2000 | |
| DE | 102010045079 | A1 | 3/2012 | |
| DE | 102011082232 | A1 * | 10/2012 | F02P 3/02 |
| DE | 202012104013 | U1 * | 2/2014 | H01F 27/306 |
| FR | 2502836 | A1 | 10/1982 | |
| FR | 2543773 | A1 | 10/1984 | |
| JP | H0358807 | A | 3/1991 | |
| JP | H0470718 | U | 6/1992 | |
| JP | H04267313 | A | 9/1992 | |
| JP | H0531169 | U | 4/1993 | |
| JP | H0533515 | U | 4/1993 | |
| JP | H073111 | U | 1/1995 | |
| JP | H07003111 | U | 1/1995 | |
| JP | H08330163 | A | 12/1996 | |
| JP | 2009141065 | A | 6/2009 | |
| JP | 2009158886 | A | 7/2009 | |
| WO | 2012014250 | A1 | 2/2012 | |

* cited by examiner

INDUCTIVE COMPONENT

CROSS-REFERENCE TO RELATED APPLICATIONS

This is a divisional application of U.S. application Ser. No. 15/521,565 entitled "Inductive Component," which was filed on Apr. 24, 2017, which is a national phase filing under section 371 of PCT/EP2015/074130, filed Oct. 19, 2015, which claims the priority of German patent application 10 2014 116 139.4, filed Nov. 5, 2014, all of which is incorporated herein by reference in its entirety.

TECHNICAL FIELD

The invention relates to an inductive component, in particular transformers and inductors, comprising one or more windings and also a magnetic core.

BACKGROUND

An inductive component, for example, a transformer, comprises a magnetic core, around which a coil is arranged. The coil may comprise a coil former on which electrical conductors are wound. In order in the case of such an inductive component, in particular a component of a small structural form, to ensure a sufficient degree of high-voltage resistance, the coil and the magnetic core may be accommodated in a housing and surrounded by a potting material, so that the electrical conductors, the coil former and the magnetic core are completely embedded in the potting material.

On account of the different temperature behavior, in particular the different coefficients of thermal expansion, of the magnetic core and the potting material, when there are temperature fluctuations mechanical stresses may occur in the potted assembly. Even with small temperature fluctuations, the magnetic and electrical parameters of the material of the magnetic core may change on account of the mechanical stress occurring in the core material, so that there is the risk of the inductive component no longer conforming to a required specification. With greater temperature fluctuations, the magnetic core, for example, a ferrite core, which is sensitive to material stresses, may be damaged or destroyed.

SUMMARY

Embodiments of the invention provide an inductive component with which mechanical stresses within a core material of the inductive component can be avoided to the greatest extent, and the electrical properties of the inductive component can be influenced as little as possible, when there are temperature fluctuations.

According to one possible embodiment, the inductive component comprises at least one electrical conductor, a coil former with a hollow-shaped winding former, on the surface of which the at least one electrical conductor is wound around the winding former, and a magnetic core, which is arranged in a cavity of the winding former. The at least one electrical conductor is surrounded by a potting material, the potting material however having no directly adherent contact with the magnetic core.

In the case of the inductive component according to the invention, the magnetic core is consequently not embedded together with the coil former and the at least one electrical conductor wound on it in the potting material. Instead, only the at least one electrical conductor is encapsulated by the potting material. The coil former may likewise be embedded in the potting material. On the other hand, the magnetic core is decoupled from the potting material, so that, when there are temperature changes on account of the different coefficients of expansion of the potting material and the material of the magnetic core, no mechanical stresses occur in the core material. Since the core is located outside the at least one potted electrical conductor, it is only subjected to minor defined mechanical forces, which originate substantially from the coil.

The inductive component may be formed in particular as a transformer or as an inductor comprising one or more wound electrical conductors. If the inductive component contains two or more electrical conductors, which belong to different windings, the electrical conductors are separated from one another for reliable voltage separation and galvanically separated from one another with respect to the core by the potting material. The windings are consequently insulated from one another and from the core.

According to one possible embodiment, the coil former and the at least one electrical conductor wound on it may be arranged in a protective body for protecting the at least one electrical conductor. The potting material is located in a cavity between the at least one electrical conductor or the coil former and the protective body. The protective body serves in this case as a potting container, into which the potting material is filled during the production of the component, initially in a liquid or viscous form, before the potting material is subsequently cured.

According to a preferred embodiment, the protective body or the potting container and the coil former are adapted to one another by shaping measures in such a way that no liquid potting material escapes from a gap between the coil former and the protective body during the potting. The coil former and the protective body may be fastened to one another in a self-sealing manner, for example, by a tongue-and-groove connection. Consequently, already during production, the magnetic core of the inductive component does not come into contact with the potting material. The self-sealing connection between the coil former and the protective body obviates the need for additional costly measures, for example, adhesive bonding of the magnetic core with the potting material or subsequent cleaning of the magnetic core. The core-coil type of configuration can be applied to most customary forms of core, for example, E cores, U cores, I cores, PQ cores or rod cores.

BRIEF DESCRIPTION OF THE DRAWINGS

The invention is explained in more detail below on the basis of figures, which show exemplary embodiments of the present invention, in particular as a transformer, and in which.

Various embodiments of an inductive component, which is formed as a transformer comprising the two electrical conductors 10*a* and 10*b*, are described below. However, the inductive component, for example, in the embodiment as an inductor or autotransformer, may comprise only one electrical conductor or, for example, in the embodiment as a current-compensated inductor, also comprise more than two electrical conductors.

DETAILED DESCRIPTION OF ILLUSTRATIVE EMBODIMENTS

Figure 1:
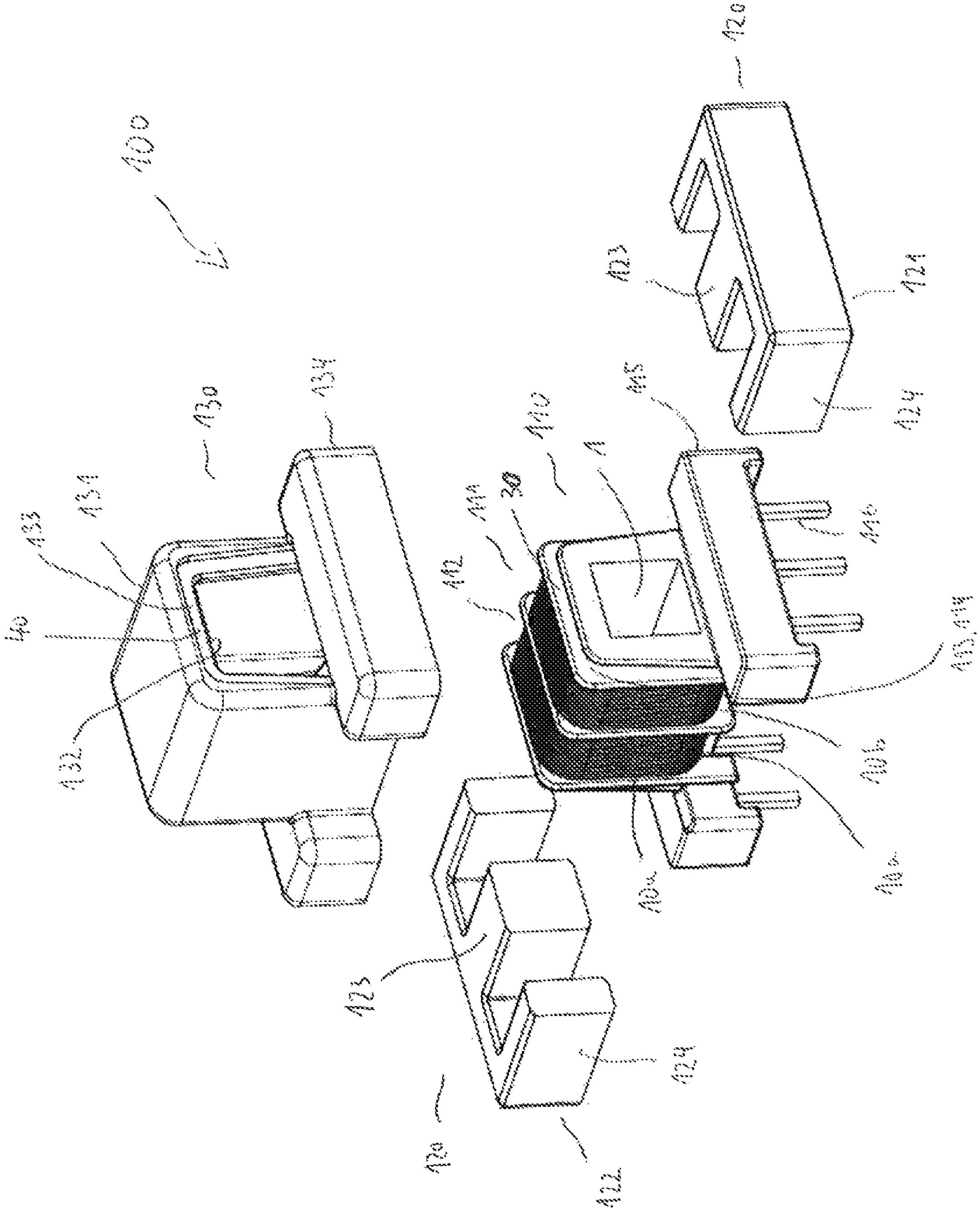
FIG. 1 shows an exploded view of a first embodiment of an inductive component.

FIG. 1 shows an exploded view of a first embodiment 100 of an inductive component, for example, a transformer. The inductive component comprises a coil former 110 with a hollow-shaped winding former 111, on the surface of which the electrical conductors 10*a*, 10*b*, which are associated with different windings, are wound. The inductive component also comprises a magnetic core 120, which is arranged in a cavity 1 of the winding former 111. The magnetic core 120 comprises a part-body 121 and a part-body 122, which are connected to one another, for example, are adhesively bonded to one another.

In the case of the embodiment shown in FIG. 1, the two part-bodies 121, 122 of the magnetic core are formed in each case as an E core. The two core halves are introduced into the cavity 1 of the coil former 110 from different sides, so that a respective leg, for example, the central leg 123, of each core half 121, 122, is arranged in the cavity 1 of the winding former 111 and the other legs 124 of each body 121, 122 are arranged outside the cavity 1 of the winding former 111. The two part-bodies may be adhesively bonded to one another at the end faces of their legs.

The inductive component additionally comprises a protective body 130 with a covering element 131 for protecting the electrical conductors 10*a*, 10*b*. The coil former 110 and the protective body 130 are formed in such a way that the coil former 110 can be fastened to the protective body 130 and the electrical conductors 10*a*, 10*b* are covered by the covering element 131, and are consequently protected.

The winding former 111 has a winding region 112 for being wound with the electrical conductors 10*a* and 10*b* and a fastening region 113 for fastening the coil former 110 to the protective body 130. The fastening region 113 is arranged laterally of the winding region 112 on the winding former 111. The coil former 110 has contacting regions 115 for contacting the electrical conductors 10*a*, 10*b* and for applying a voltage to the electrical conductors 10*a*, 10*b*. For applying a voltage, contact pins 116 are arranged on the contacting region 115. The protective body 130 comprises a receiving region 134 for receiving the contacting region 115 when the coil former 110 is arranged in the protective body 130.

Figure 2:
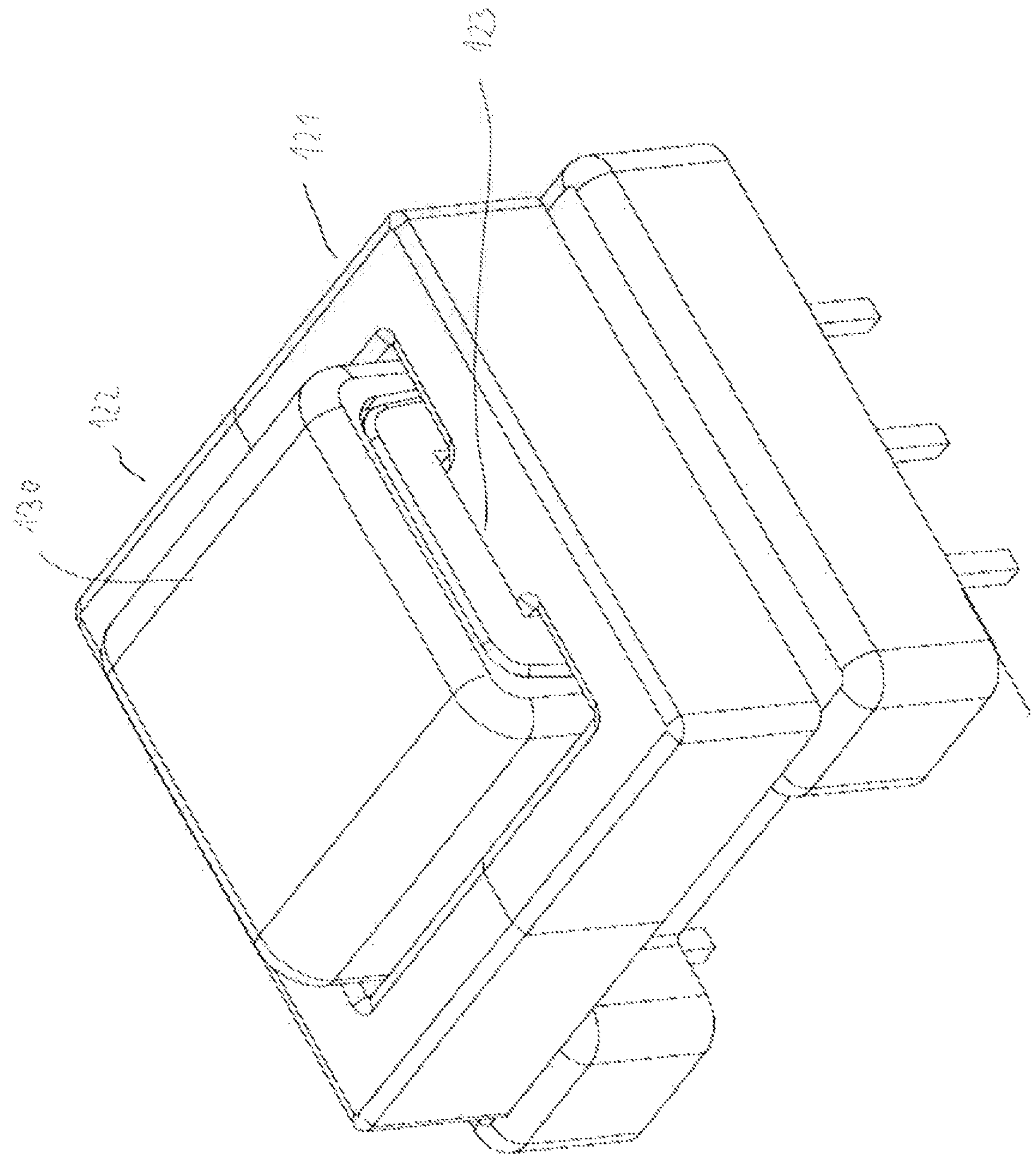
FIG. 2 shows a plan view of the first embodiment of the inductive component.

FIG. 2 shows a plan view of the inductive component, after the assembly of the various components shown in FIG. 1. In the assembled state of the inductive component, the coil former 110 with the electrical conductors 10*a* and 10*b* wound on it has been inserted into the protective body 130 and fastened to the protective body. After the fastening of the coil former no to the protective body 130, the electrical conductors 10*a*, 10*b* are surrounded by the covering element 131 of the protective body 130, and are consequently protected. The magnetic core 120 is fixed to the arrangement comprising the coil former 120 and the protective body 130. The respective central leg 123 of the two part-bodies 121, 122 of the magnetic core is arranged in the cavity 1 of the coil former 110. The respective outer legs 124 of each part-body are arranged outside the cavity 1.

Figure 3A:
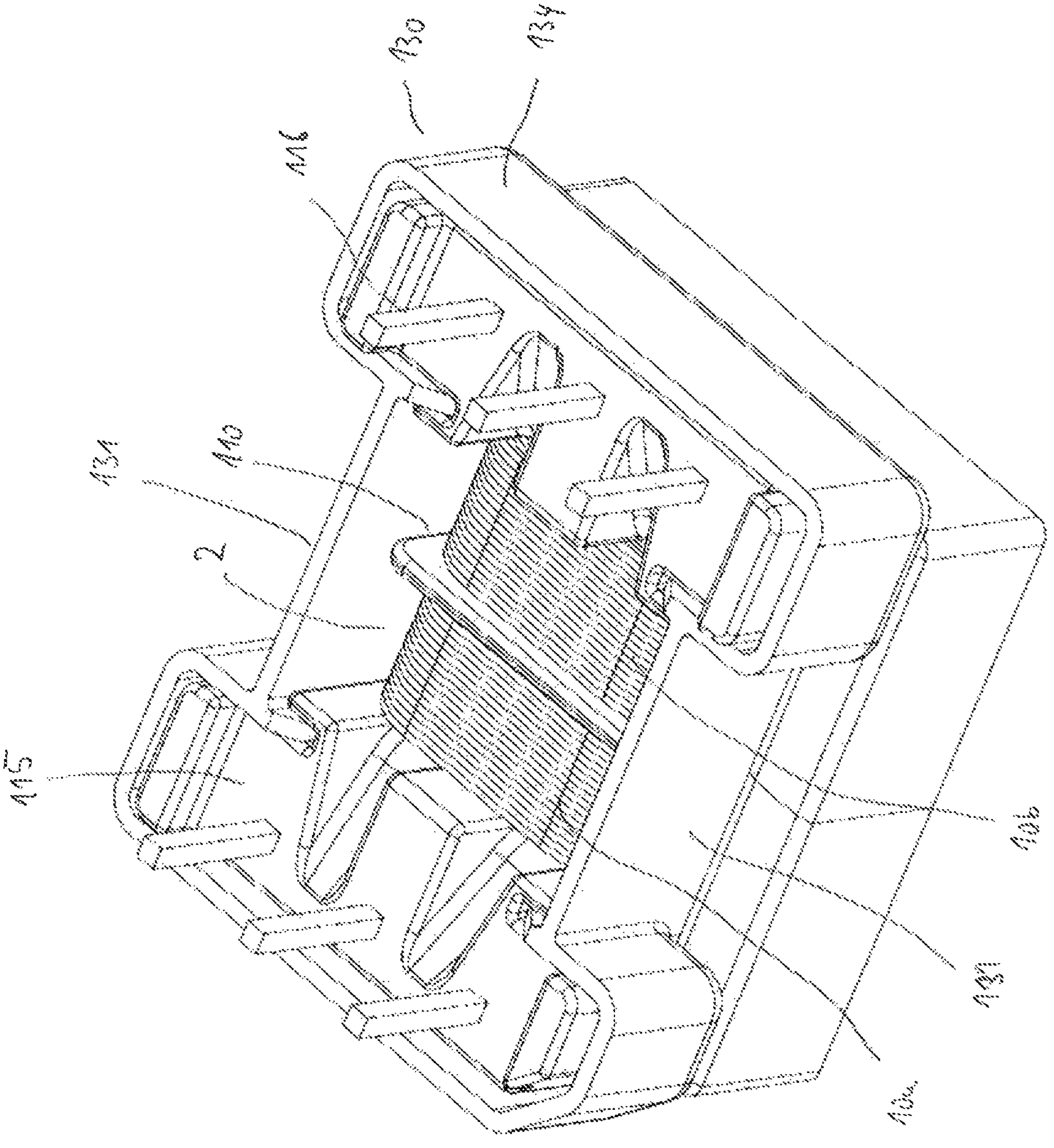
FIG. 3A shows a rear view of the first embodiment of the inductive component without potting material.

FIG. 3A shows a rear view of the inductive component of the embodiment 100, in which the coil former 110 has been inserted into the protective body 130. As becomes clear from FIG. 3A, the coil former 110 and the protective body 130 are shaped in such a way that, in the assembled state of the component, the contacting region 115 of the coil former is arranged in the receiving region 134 of the protective body. The contact pins 116 protrude out of the contacting region 115, and consequently on the underside of the protective body 130.

Figure 3B:
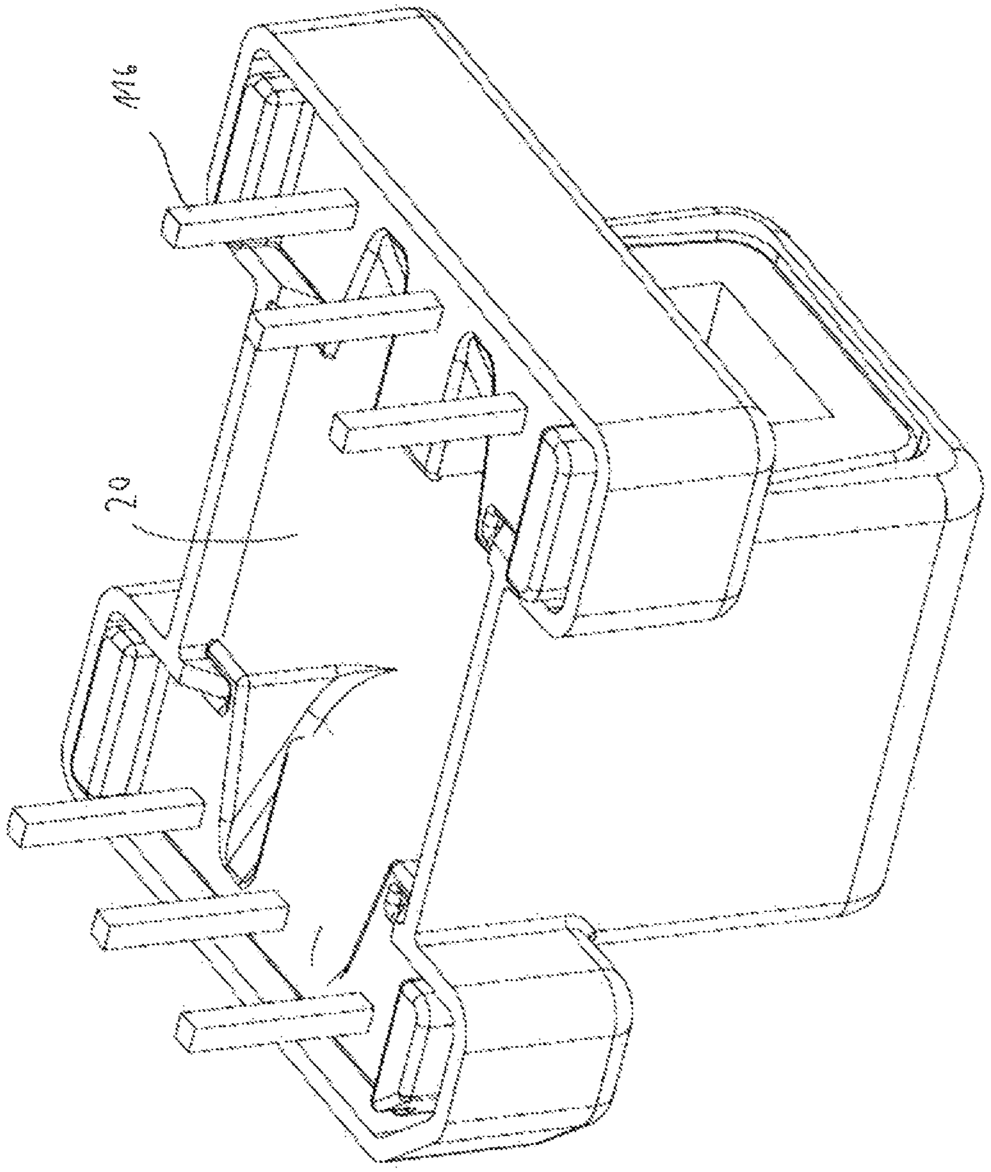
FIG. 3B shows a rear view of the first embodiment of the inductive component with potting material.

Formed between the electrical conductors 10*a* and 10*b* and the covering element 131 is a cavity 2. Arranged in the cavity 2 is a potting material 20. The cavity 2 is filled by a potting material 20 in such a way that the electrical conductors 10*a* and 10*b* are embedded in the potting material. The potting material may also be in contact with the winding former 111. FIG. 3B shows the rear side of the inductive component after the potting. The protective body 130 serves during the potting as a potting container for filling with the potting material. The potting material may be, for example, a casting resin. In the case of the variant shown in FIG. 3B, the potting material 20 surrounds the coil former 110 with the electrical conductors 10*a* and 10*b*, so that only the contact pins 116 are free from the potting material and protrude out from the underside of the protective body 130. The potting material 20 has no contact, or no directly adherent contact, with the magnetic core 120, as is shown in FIG. 2. As a result, no mechanical stresses occur in the core material of the magnetic core 120 on account of temperature fluctuations and different coefficients of expansion of the potting material and the material of the magnetic core. Furthermore, the windings are galvanically separated from one another and from the core.

In order to prevent the potting material 20 and the magnetic core 120 from coming into contact with one another, the coil former 110 and the protective body 130 are formed in such a way that the winding former 111 is fastened in a self-sealing manner to the protective body 130 and any escape of the potting material 20 from the cavity 2 between the electrical conductors 10*a*, 10*b* and the covering element 131 of the protective body 130 is prevented.

Figure 4A:
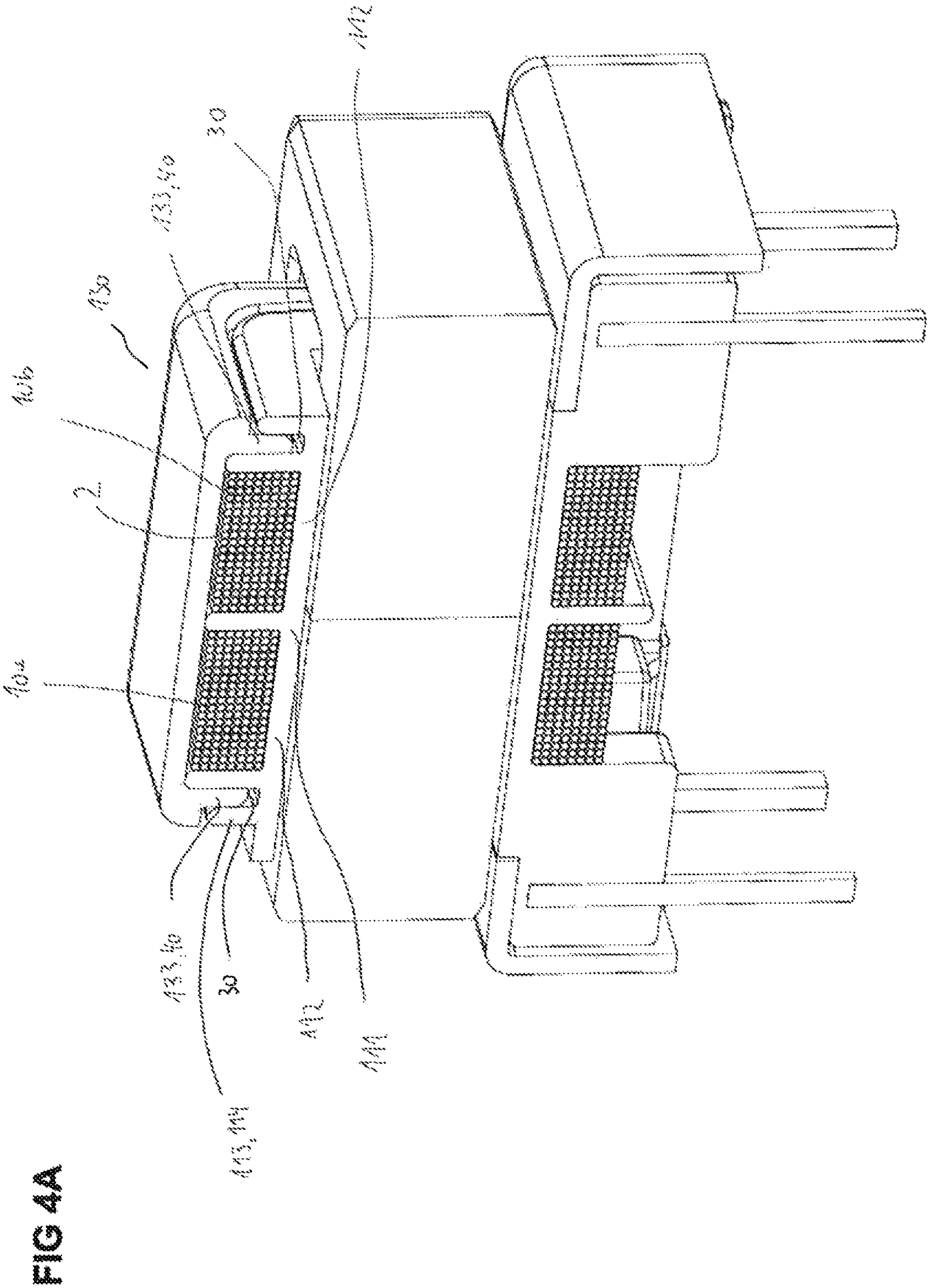
FIG. 4A shows a transverse view of the first embodiment of the inductive component in a perspective representation.
Figure 4B:
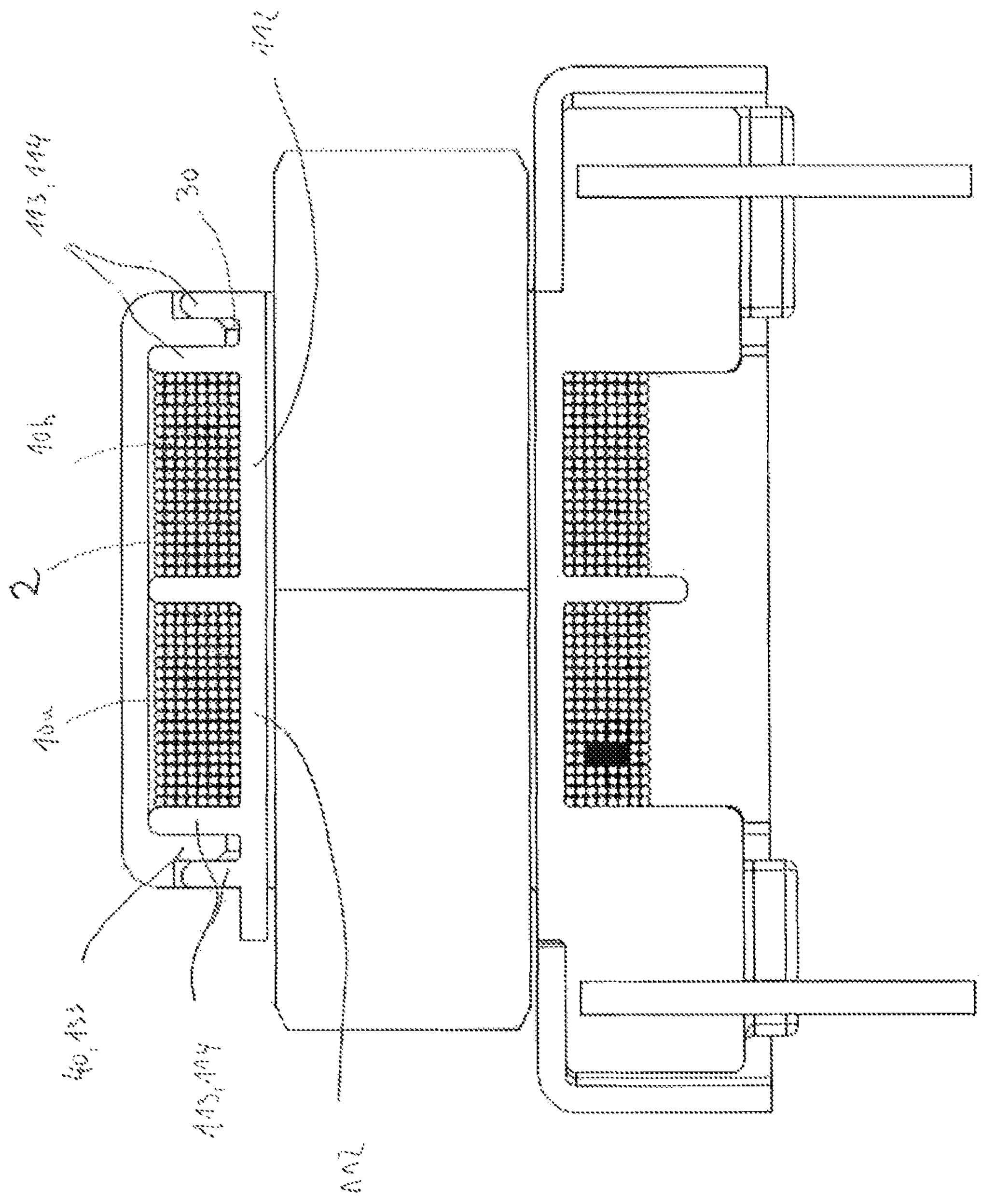
FIG. 4B shows a cross section through the first embodiment of the inductive component.

FIGS. 4A and 4B respectively show a perspective cross section and a simple cross section through the embodiment 100 of the inductive component. The electrical conductors

10*a* and 10*b* are wound up on the winding region 112 of the winding former 111. Respectively provided on both sides of the winding region 112 is the fastening region 113 for fastening the coil former 120 to the protective body 130.

According to one embodiment, the covering element 131 may comprise a bottom part 132, which lies opposite the electrical conductors 10*a*, 10*b*. The bottom part 132 of the covering element may comprise respectively on both sides a side part 133. The winding former 111 may have flanges 114 for delimiting the winding region 112. According to one possible embodiment, either the flanges 114 of the coil former may have in each case a recess 30 and the side parts 133 of the covering element may have in each case a web 40. According to another embodiment, the flanges 114 may have in each case a web 40 and the side parts 133 may have in each case a recess 30. The coil former 111 is fastened to the protective body 130, in that each of the webs 40 engages in one of the recesses 30. The recesses 30 and the webs 40 are formed in such a way that any escape of the potting material 20 from the cavity 2 between the electrical conductors 10*a*, 10*b* and the covering element 131 of the protective body 130 in the region of the recesses 30 and the webs 40 is prevented.

Figure 5:
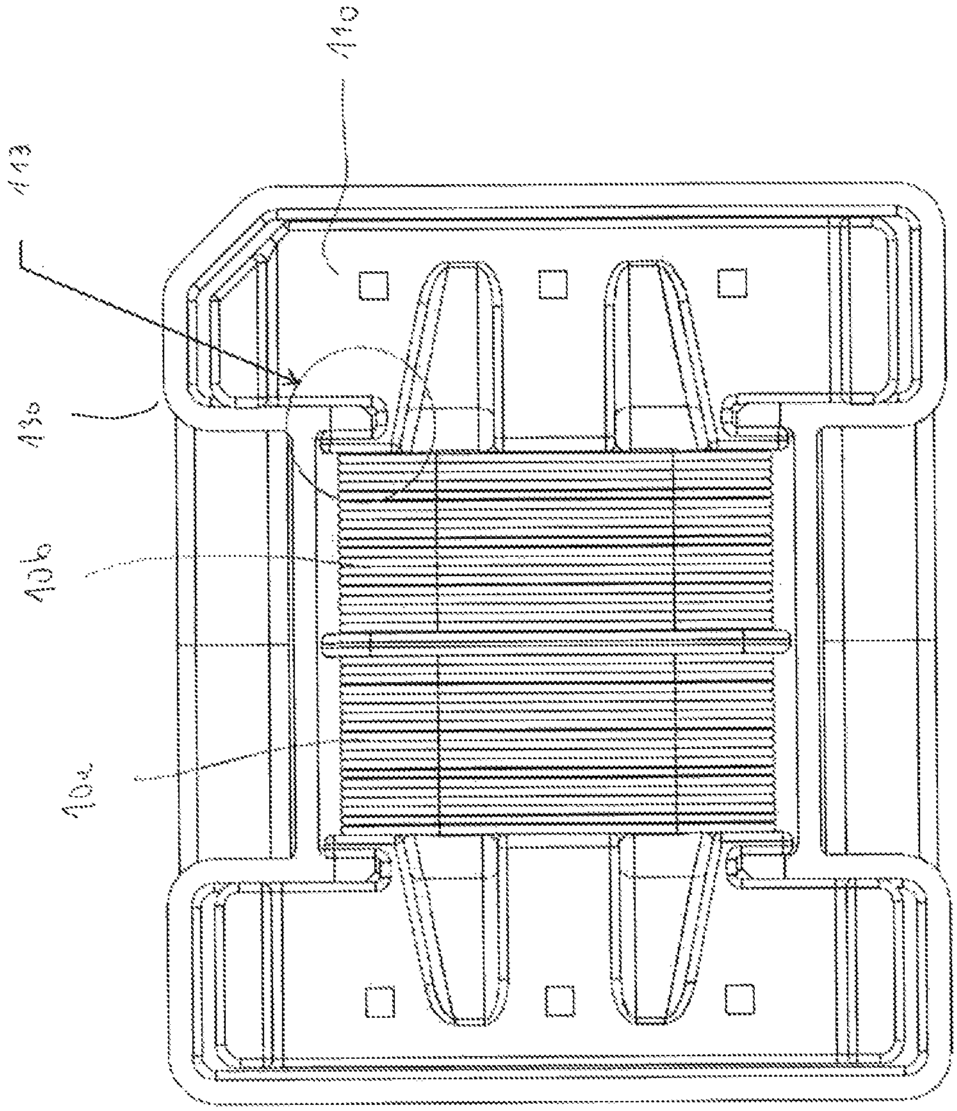
FIG. 5 shows a rear view of the first embodiment of the inductive component with a tongue-and-groove connection between a coil former and a protective body of the inductive component.

The embodiment of the inductive component shown in FIGS. 4A and 4B, in which the flanges 114 have in each case a recess 30 and the side parts 133 of the protective body have in each case a web 40, means that the fastening region 113 of the coil former 111 and the side parts 133 of the protective body 130 are shaped in such a way that a tongue-and-groove connection is formed between the fastening region 113 and the protective body 130. FIG. 5 shows the tongue-and-groove connection between the coil former 111 and the protective body 130 in the fastening region 113. The tongue-and-groove connection is designed in particular in such a way that a self-sealing connection is realized between the coil former 111 and the protective body 130. As a result, any escape of the potting material 20 from the cavity 2 between the electrical conductors 10*a*, 10*b* and the covering element 131 of the protective body is prevented.

Figure 6A:
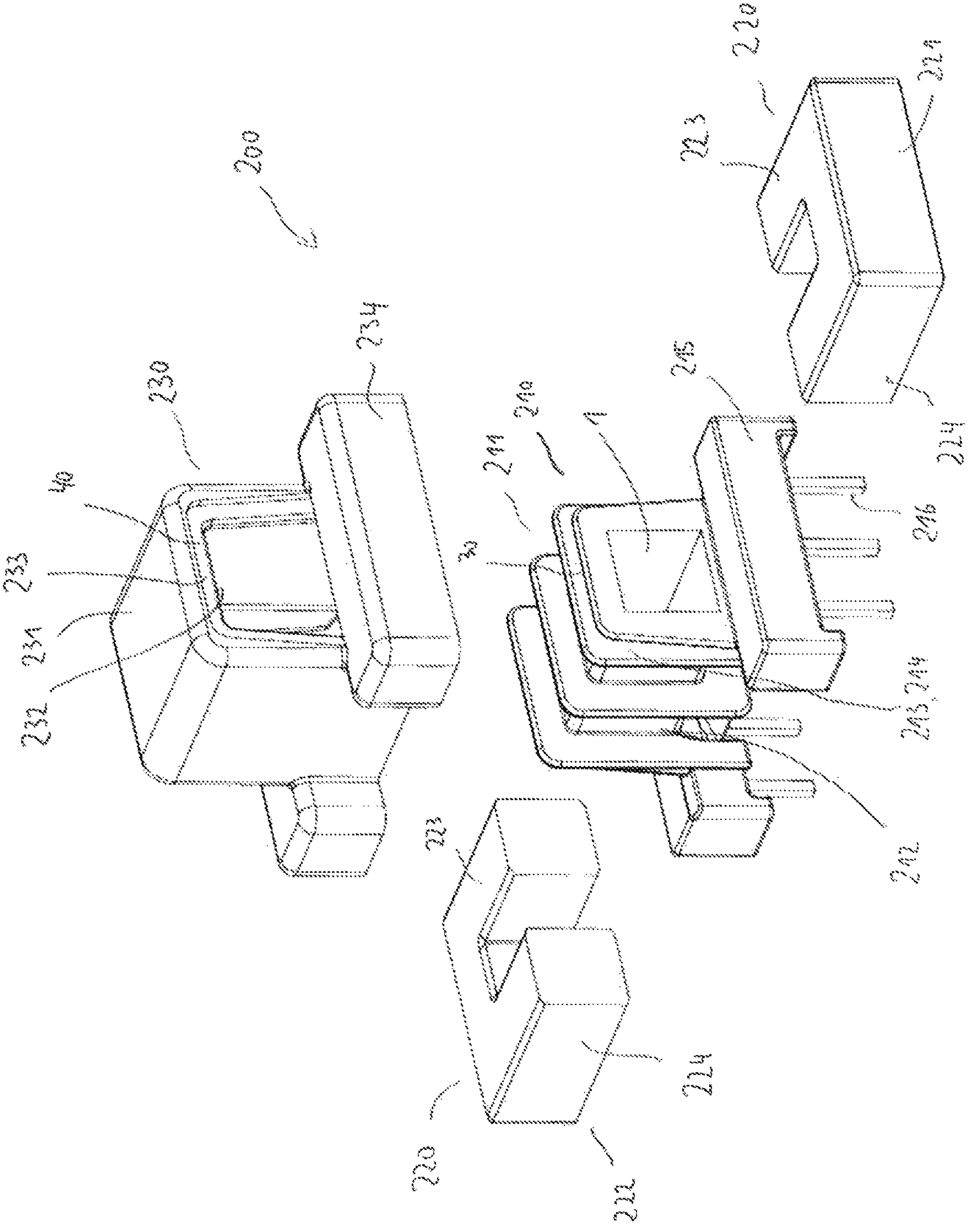
FIG. 6A shows an exploded view of a second embodiment of the inductive component.

FIG. 6A shows an exploded view of a second embodiment of the inductive component comprising a coil former 210 with a hollow-shaped winding former 211, on the surface of which electrical conductors may be wound in a number of turns in each case. The winding former 211 comprises a winding region 212 for being wound with the electrical conductors. As a difference from FIG. 1A, the electrical conductors 10*a* and 10*b* are not represented for the sake of simplicity. The coil former 210 also has a contacting region 215 for contacting the electrical conductors and for applying a voltage to the electrical conductors. Contact pins 216 are arranged on the contacting region 215.

The inductive component comprises a magnetic core 220, which in an assembled state of the inductive component is arranged in a cavity 1 of the winding former 211. The magnetic core 220 comprises the two part-bodies 221, 222, which in the assembled state are connected to one another. In the case of the embodiment of the inductive component shown in FIGS. 6A and 6B, the two part-bodies are formed in each case as a U core. For this purpose, the part-bodies 221, 222 may be adhesively bonded to one another at the end faces of their legs 223, 224. The inductive component also comprises a protective body 230 with a covering element 231 for protecting the electrical conductors applied to the winding former 211. The protective body 230 has a receiving region 234 for receiving the contacting region 215.

During the assembly of the individual components of the inductive component that are represented in FIG. 6A, the protective body 230 is arranged over the coil former 210 and fastened to the coil former. The electrical conductors arranged on the coil former 210 are surrounded by the covering element 231. The winding former 211 comprises a fastening region 213 for fastening the coil former 220 to the protective body 230. The fastening region 213 is arranged laterally of the winding region 212.

Figure 6B:
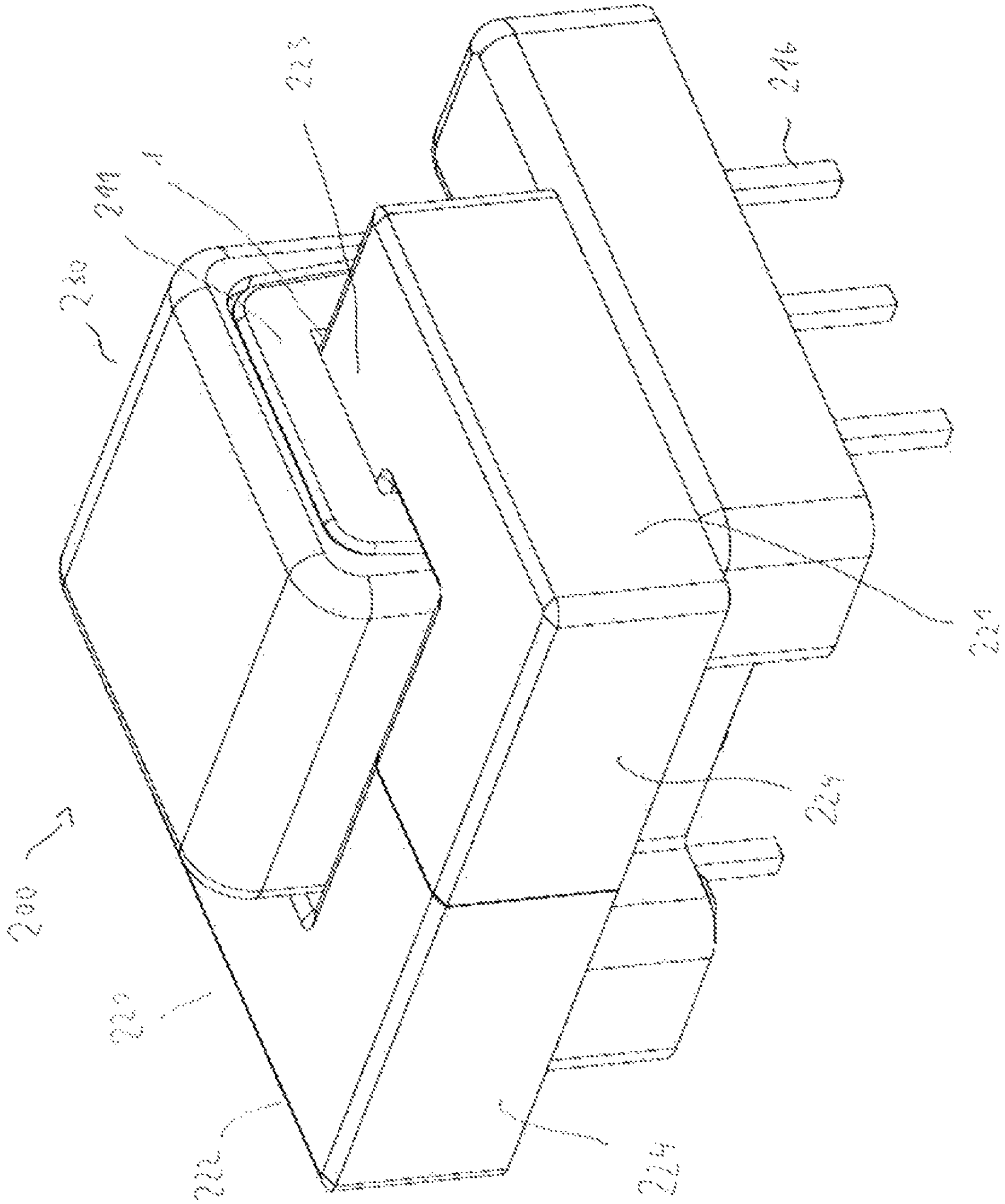
FIG. 6B shows a plan view of the second embodiment of the inductive component.

FIG. 6B shows the individual components of the inductive component of the embodiment 200 that are shown in FIG. 6A in an assembled state. The coil former 210 has been inserted into the protective body 230. The contacting region 215 is arranged in the receiving region 234 of the protective body. Formed between the electrical conductors applied to the coil former 210 and the covering element 231 is a cavity. The cavity is filled by the potting material 20, so that the electrical conductors are surrounded by the potting material and only the contacting pins 216 protrude out of the protective body 230 on the underside of the component. According to a further embodiment, the coil former 210 may also be surrounded by the potting material 20 or be embedded in the potting material. The potting material may be, for example, a casting resin, which is filled in a liquid or viscous state into the cavity between the electrical conductors and the covering element and is subsequently cured. The electrical conductors are insulated from one another and insulated from one another with respect to the core for voltage separation by the potting material.

However, the potting material 20 has no contact, or no directly adherent contact, with the magnetic core 220. As shown in FIG. 6B, in each case one of the legs 223 of the two part-bodies of the core 220 is arranged in the cavity 1 of the winding former 211. The other leg 224 respectively of the two part-bodies is arranged outside the cavity 1 of the winding former 211. Consequently, the magnetic core 220 does not come into contact with the potting material 20 and is decoupled from the potting material.

In order to prevent the potting material 20 from running out of the cavity between the electrical conductors and the covering element 231 of the protective body, the winding former 211 is fastened in a self-sealing manner to the protective body 230. The fastening may take place, for example, by a tongue-and-groove connection between the fastening region 213 and the protective body 230.

The covering element 231 may comprise, for example, a bottom part 232, which lies opposite the electrical conductors in the assembled state. Respectively provided on both sides of the bottom part 232 there may be a side part 233. The winding former 210 may have flanges 214 for delimiting the winding region 211. For producing the tongue-and-groove connection, according to one possible embodiment the flanges may have in each case a recess 30 and the side parts 233 may have in each case a web 40. According to another possibility for realizing the tongue-and-groove connection, the flanges 214 may have in each case a web 40 and the side parts 233 may have in each case a recess 30. The coil former 210 may be fastened to the protective body 230, in that each of the webs 40 engages in one of the recesses 30. In this case, the recesses 30 and the webs 40 are formed in such a way that any escape of the potting material 20 from the cavity between the electrical conductors and the covering element 231 in the region of the recesses 30 and the webs 40 is prevented.

Figure 7A:
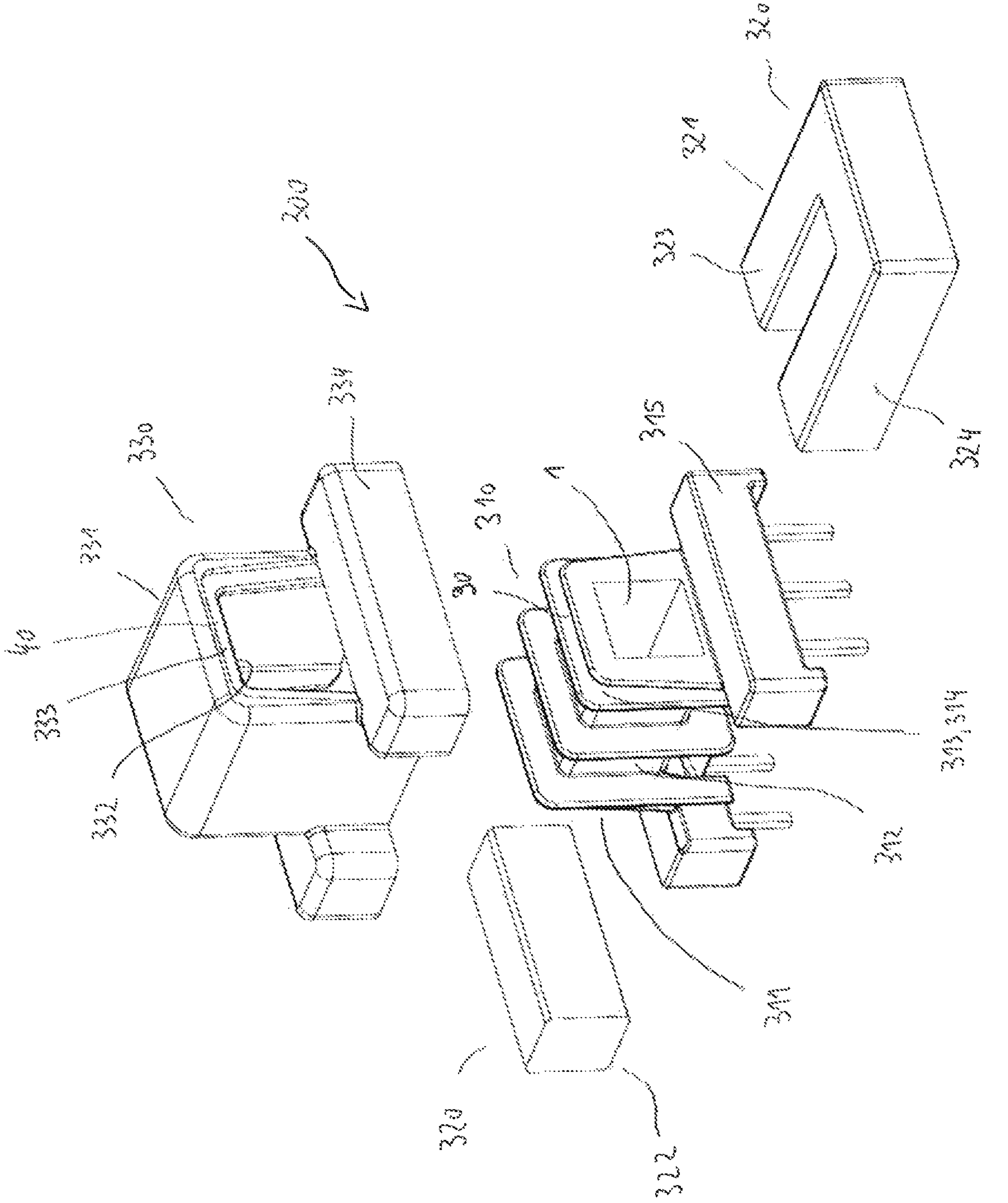
FIG. 7A shows an exploded view of a third embodiment of the inductive component.

FIG. 7A shows an exploded view of a third embodiment 300 of the inductive component. The inductive component comprises a coil former 310 with a hollow-shaped winding former 311, on the surface of which electrical conductors are arranged. For reasons of simplicity, only the coil former 310 is shown in FIG. 7A, without the electrical conductors 10*a* and 10*b*. The coil former 310 comprises a contacting region 315 for contacting the two electrical conductors and for applying a voltage to the electrical conductors.

The inductive component also comprises a magnetic core 320, which is arranged in a cavity 1 of the winding former 311. The magnetic core 320 comprises the two part-bodies 321 and 322. The part-body 321 of the magnetic core may be configured as a U core and the part-body 322 of the magnetic core may be configured as an I core. In the assembled state, the two part-bodies 321, 322 are connected to one another, in that the part-body 322, for example, bonds to the end faces of the legs 323, 324 of the part-body 320 by an adhesive connection. The inductive component also comprises a protective body 330 with a covering element 331 for protecting the two electrical conductors 10*a* and 10*b*. The protective body 330 has a receiving region 334 for receiving the contacting region 315.

Figure 7B:
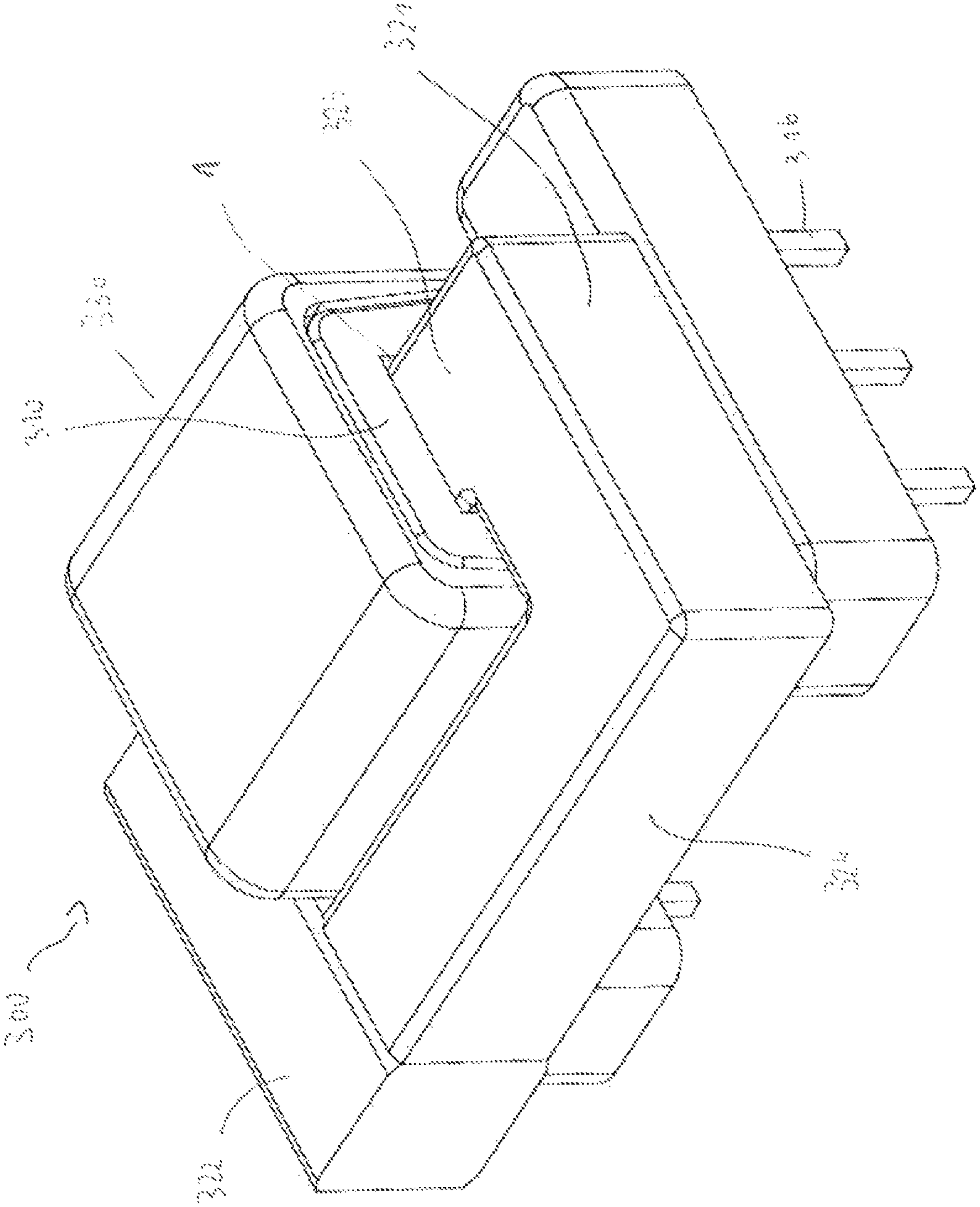
FIG. 7B shows a plan view of the third embodiment of the inductive component.

FIG. 7B shows a plan view of the embodiment 300 of the inductive component in the assembled state. In the assembled state of the inductive component, the coil former 310 has been inserted into the protective body 330, in that the protective body 330 is fitted over the coil former 310 and fastened to the coil former, so that the two electrical conductors that are arranged on the coil former are surrounded by the covering element 331. In the assembled state, the contacting region 315 is arranged in the receiving region 334 of the protective body, and is consequently covered by the receiving region 334, so that only contacting pins 316 of the coil former 310 protrude out of the protective body 330. The magnetic core 320 is arranged in the cavity 1 of the winding former 311, in that one of the two legs 323 of the part-body 321 is arranged in the cavity 1 and the other leg 324 is arranged outside the cavity 1. The part-body 321 is adhesively bonded at the end faces of the two legs 323, 324 to the part-body 322 of the magnetic core.

In the assembled state of the inductive component, formed on the coil former and the covering element 331 between the two electrical conductors is a cavity, which is filled by a potting material 20. As a result, the two electrical conductors are surrounded by the potting material. The potting material may also be in contact with the winding former 311. The potting material has no directly adherent contact with the magnetic core 320.

Initially in a liquid state, the potting material may be filled into the cavity between the electrical conductors and the covering element of the protective body and subsequently cured. In order to prevent the potting material from running out of the cavity between the two wire windings and the covering element 331, the winding former 311 may be fastened in a self-sealing manner to the protective body 330. The winding former 311 has a winding region 312 for being wound with the two electrical conductors and a fastening region 313 for fastening the coil former 320 to the protective body 330. The fastening region 313 is arranged laterally of the winding region 312. The self-sealing connection between the winding former 311 and the protective body 330 may be realized by a tongue-and-groove connection between the fastening region 313 and the protective body 330.

The covering element 331 may comprise a bottom part 332, which lies opposite the electrical conductors. Respectively arranged on both sides of the bottom part there may be a side part 333. The winding former 311 comprises flanges 314 for delimiting the winding region. For realizing the tongue-and-groove connection, according to one possible embodiment the flanges 314 may have in each case a recess 30 and the side parts 333 may have in each case a web 40. According to another embodiment, the flanges 314 may have in each case a web 40 and the side parts 333 may have in each case a recess 30. The coil former 310 is fastened in a self-sealing manner to the protective body 330, in that each of the webs 40 engages in one of the recesses 30. The recesses 30 and the webs 40 are formed in such a way that any escape of the potting material 20 from the cavity between the electrical conductors and the covering element 331 in the region of the recesses 30 and the webs 40 is prevented.

Figure 8A:
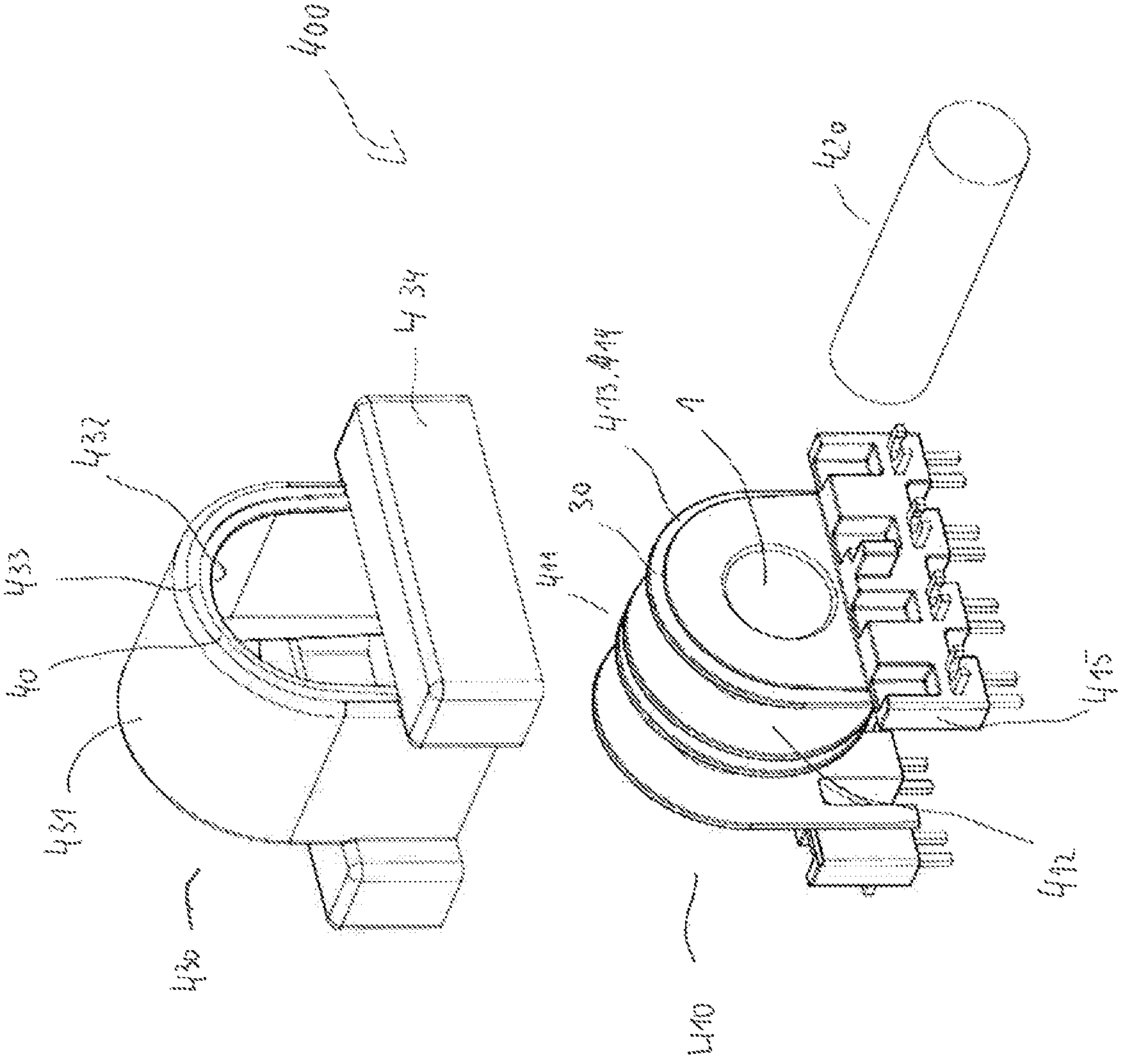
FIG. 8A shows an exploded view of a fourth embodiment of the inductive component.

FIG. 8A shows an exploded view of a fourth embodiment 400 of the inductive component comprising a coil former 410 with a hollow-shaped winding former 411, on the surface of which electrical conductors are arranged. For reasons of simplifying the representation, the two electrical conductors are not depicted in FIG. 8A. As a difference from the embodiments of the coil former 110, 210, 310 with a rectangular cross section that are shown in the previous figures, the coil former 410 has a round cross section. The inductive component comprises a magnetic core 420, which in the assembled state of the inductive component is arranged in a cavity 1 of the winding former 411. According to the embodiment 400, the magnetic core 420 is formed as a rod core.

The inductive component also comprises a protective body 430 with a covering element 431 for protecting the two electrical conductors. In the assembled state, the coil former 410 is fastened to the protective body 430. In this case, the electrical conductors arranged on the coil former are surrounded by the covering element 431. The coil former 410 has a contacting region 415 for applying a voltage and for contacting the electrical conductors. The protective body 430 comprises a receiving region 434 for receiving the contacting region 415.

Figure 8B:
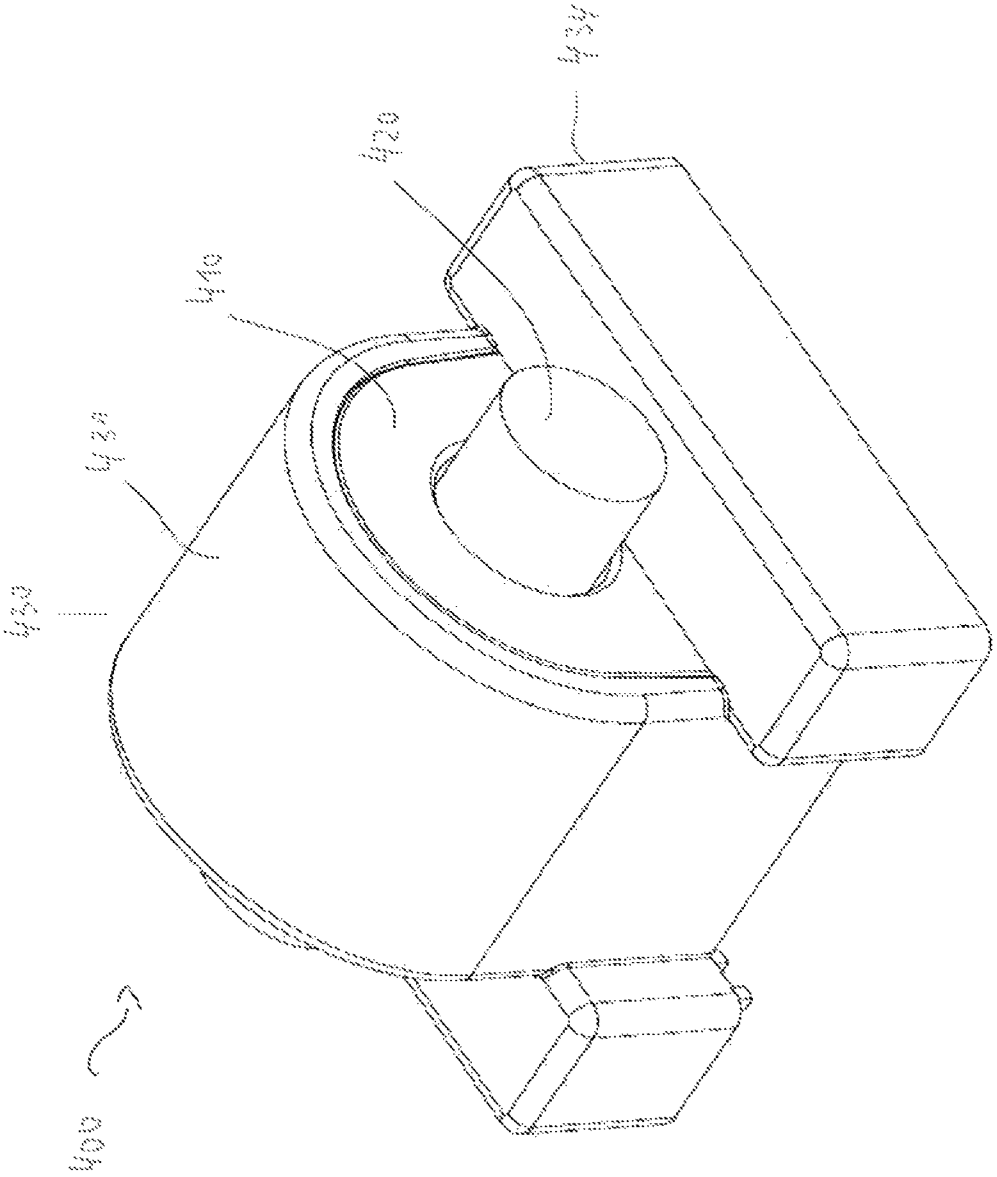
FIG. 8B shows a plan view of the fourth embodiment of the inductive component.

FIG. 8B shows the inductive component according to the embodiment 400 in an assembled state. The coil former 410 has been inserted into the protective body 430, so that the protective body surrounds the coil former. The two electrical conductors arranged on the coil former 410 are surrounded by the covering element 431. The contacting region 415 is also arranged in the receiving region 434 of the protective body 430. Formed between the two electrical conductors and the covering element 431 is a cavity, into which the potting material 20 is filled. After the curing of the initially liquid potting material, the electrical conductors are embedded in the potting material. The potting material may also be in contact with the winding former 411. The magnetic core 420 has no contact, or no directly adherent contact, with the potting material.

In order to prevent the potting material from running out of the cavity between the two electrical conductors and the covering element 431 of the protective body 430, the winding former 411 is fastened in a self-sealing manner to the protective body 430. The winding former 411 may have a winding region 412 for being wound with the electrical conductors and a fastening region 413 for fastening the coil former 420 to the protective body 430. The fastening region 430 may be arranged on both sides of the winding region 412. For realizing the self-sealing connection between the winding former 411 and the protective body 430, a tongue-and-groove connection may be formed between the fastening region 413 and the protective body 430.

The covering element 431 may comprise a bottom part 432, which lies opposite the electrical conductors. The covering element 431 may also comprise respectively on both sides of the bottom part a side part 433. The winding former 420 comprises flanges 414 for delimiting the winding region 412. For realizing the tongue-and-groove connection, according to one possible embodiment the flanges 414 may have a recess 30 and the side parts 433 may have a web 40. According to another embodiment, the flanges 414 may have in each case a web 40 and the side parts 433 may have in each case a recess 30. The coil former 410 is fastened in a self-sealing manner to the protective body 430, in that each of the webs 40 engages in one of the recesses 30.

Figure 9A:
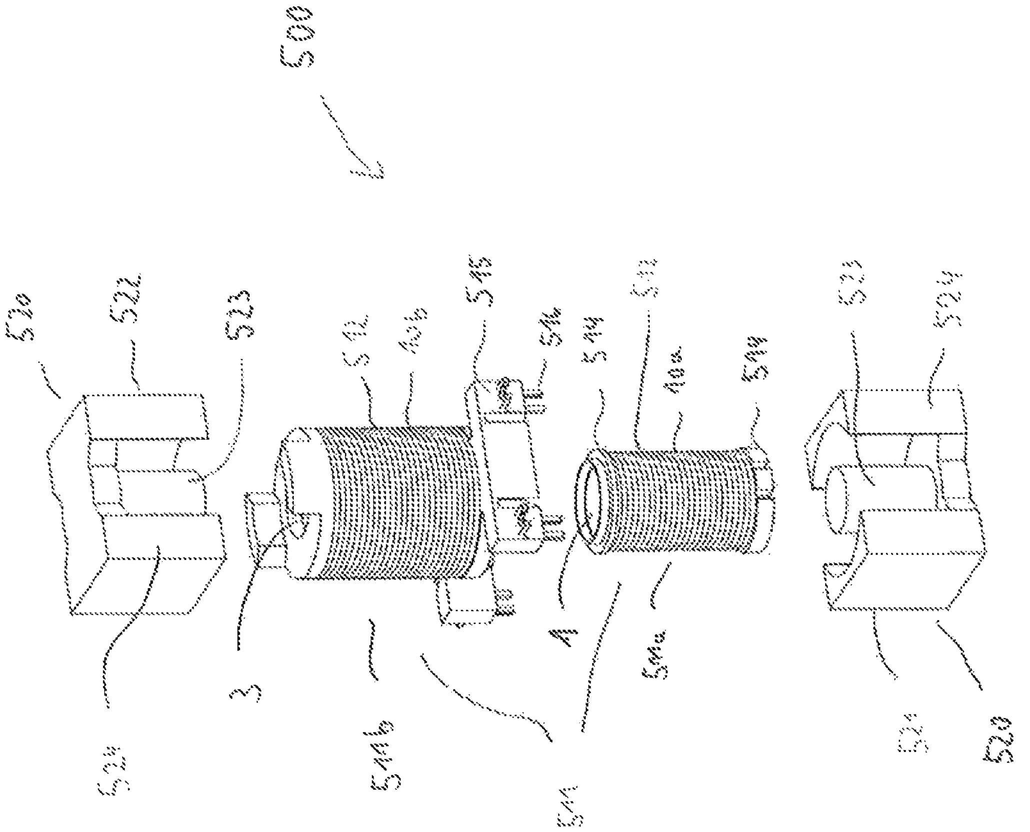
FIG. 9A shows an exploded view of a fifth embodiment of the inductive component.
Figure 9B:
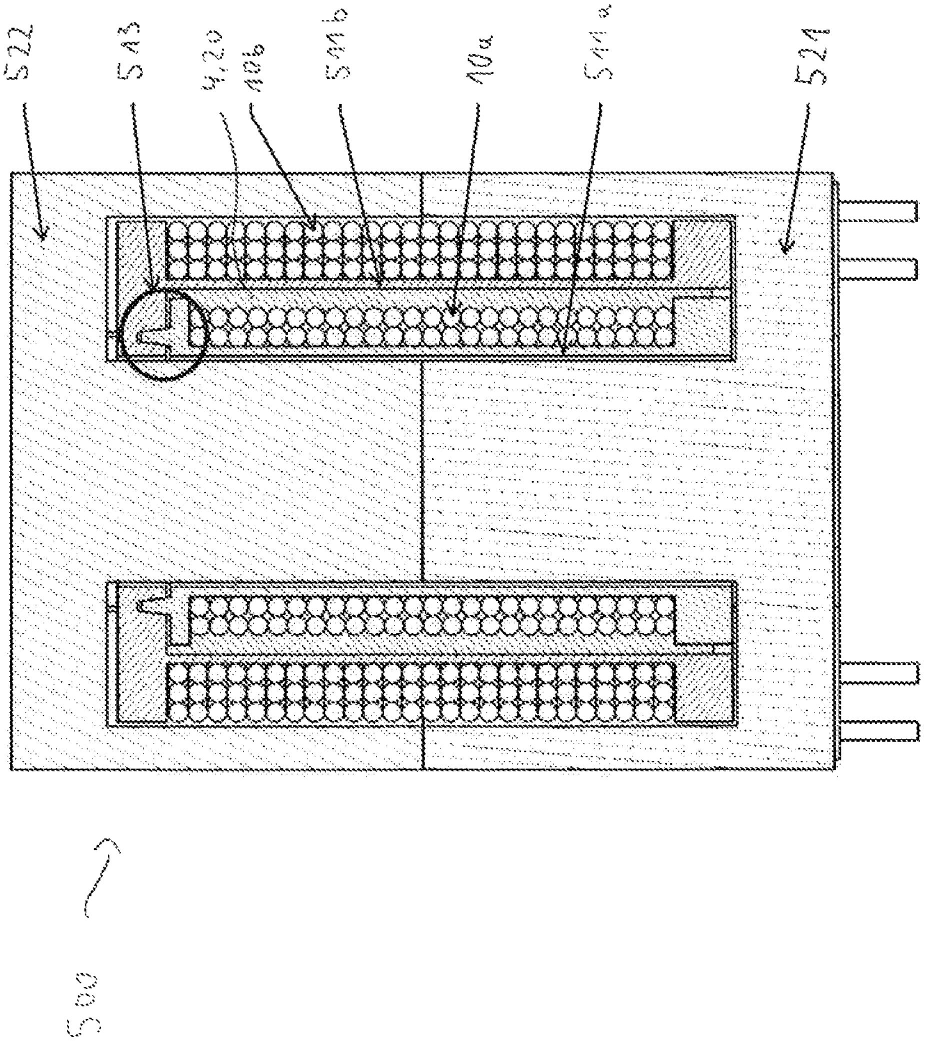
FIG. 9B shows a cross section through the fifth embodiment of the inductive component.
Figure 9C:
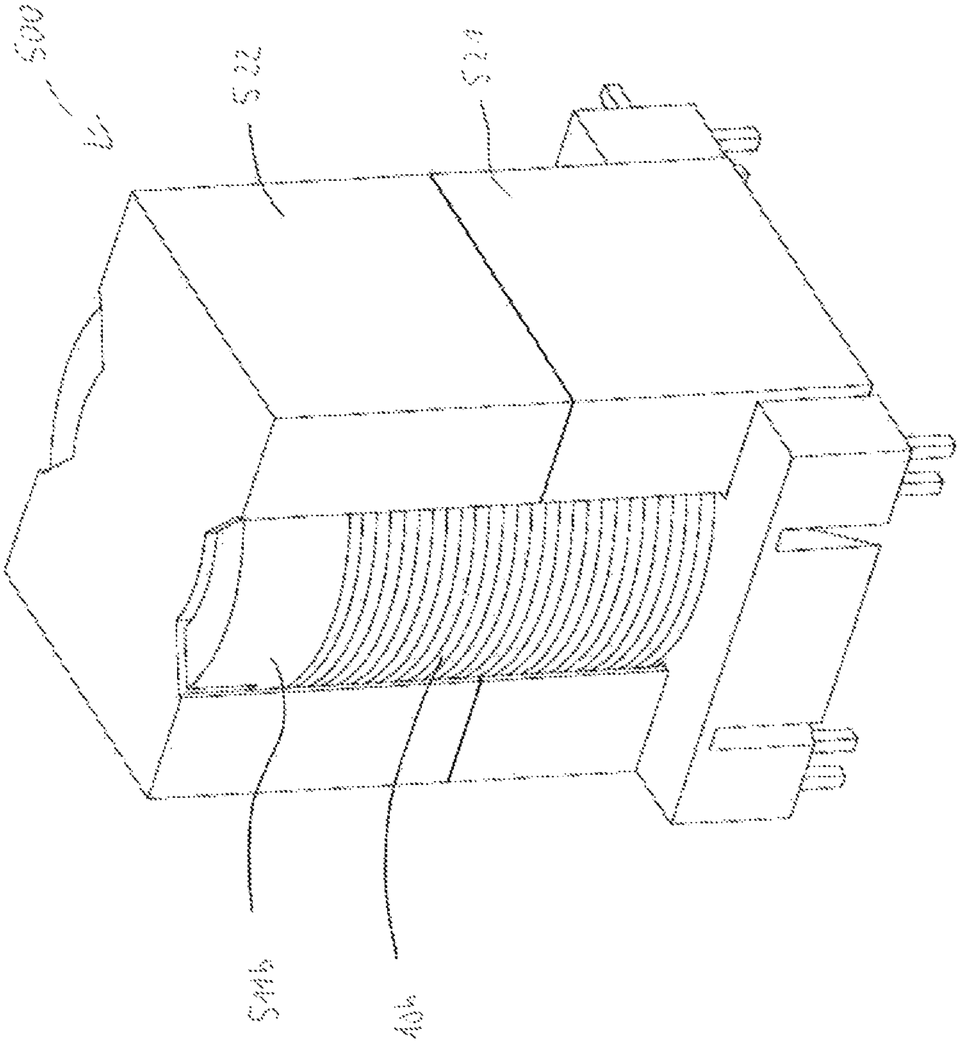
FIG. 9C shows a perspective view of the fifth embodiment of the inductive component.

FIGS. 9A to 9C show a fifth embodiment 500 of the inductive component in an exploded representation. The inductive component comprises a coil former 510 with a hollow-shaped winding former 511 and a magnetic core 520, which is arranged in a cavity 1 of the winding former 511. The winding former 511 comprises an inner part-body 511*a* with a winding region 512 for being wound with a first of the two electrical conductors 10*a* and an outer part-body 511*b* with a winding region 512 for being wound with a second of the two electrical conductors 10*b*. The inner part-body 511*a* has the cavity 1 for receiving the magnetic core 520. The outer part-body 511*b* has a cavity 3, in which the inner part-body 511*a* is arranged in an assembled state of the component. The magnetic core 520 is formed as a PQ core with a part-body 521 and a part-body 522. The two part-bodies comprise in each case an inner leg 523 and an outer leg 524.

For producing the inductive component, the inner part-body 511, wound with the electrical conductor 10*a*, is pushed into the cavity 3 of the outer part-body 511*b*. The outer part-body 511*b* has a contacting region 515 for contacting the electrical conductors 10*a* and 10*b* and for applying a voltage to the electrical conductors. Arranged on the contacting region 515 are contacting pins 516 for applying a voltage to the electrical conductors 10*a*, 10*b*.

After the inner part-body 511*a* has been pushed into the cavity 3 of the outer part-body 511*b*, a cavity 4 is formed between the electrical conductor 10*a* and the outer part-body 511*b*. FIG. 9B shows a cross section through the inductive component in the assembled state. The cavity 4 between the electrical conductor 10*a* and the outer part-body 511*b* is filled with the potting material 20, which is subsequently cured. The connection between the inner part-body and the outer part-body of the winding former 511 takes place by way of a tongue-and-groove connection 513 in the region of flanges 514 of the two part-bodies 511*a*, 511*b* of the winding former 511. The tongue-and-groove system 513 is designed in such a way that any running out of the potting material 20 from the cavity 4 is prevented.

After the assembly and potting of the coil former, the two core halves 521 and 522 are connected to one another, in that the respective inner legs 523 of the core parts 521 and 522 are pushed into the cavity 1 of the part-body 511*a* from different sides. The inner and outer legs may be adhesively bonded to one another at their end faces.

FIG. 9C shows the inductive component in an assembled state. The two outer legs 524 of the two core halves at least partially surround the outer part-body 511*b* of the coil former 512. As in the case of the previous embodiments of the inductive component, also in the case of the embodiment 500 the magnetic core 520 is decoupled from the potting material 20, so that stresses in the core material on account of the different temperature behavior between the core material and the potting material are avoided.

In the preferred embodiments described above, the connection between the coil former and the protective body or the potting container is formed in a self-sealing manner, so that no potting material can escape from the potting container. If it happens that the gap between the potting container and the coil former is not completely sealed, and therefore potting material nevertheless escapes during the potting, the core inserted thereafter into the cavity of the coil former still has no adherent contact with the potting material. The core may be adhesively bonded to the coil former at some points. Even if adhesion with the potting material also occurs thereby, there is no direct adherent contact between the potting material and the core, since a layer of adhesive is present between the core and the coil former/potting material. On account of the small number of locally confined points of adhesion, the influence of mechanical force of the potting material on the core is very small.

Apart from the embodiments of the inductive component with a protective body that are shown in FIGS. 1 to 9C, the protective body may be removed again after curing of the potting material, but before application of the core, so that the inductive component comprises the coil former with the electrical conductors, which are completely enclosed by the potting material, and the core. The conductors are galvanically separated from one another and from the core. The core itself has only little direct contact with the potted winding former. Also in the case of this embodiment, the influence of mechanical force of the potting material on the core is very small.

What is claimed is:

1. An inductive component comprising:

at least one electrical conductor;

a coil former with a hollow-shaped winding former, on a surface of which the at least one electrical conductor is wound around the winding former;

a magnetic core arranged in a first cavity of the winding former;

a potting material, wherein the at least one electrical conductor is surrounded by the potting material, wherein the potting material has no directly adherent contact with the magnetic core, wherein the magnetic core comprises a first part-body and a second part-body, which are connected to one another, wherein at least one of the first part-body or the second part-body of the magnetic core comprises a leg arranged in the first cavity of the winding former and at least one further leg arranged outside the first cavity of the winding former, and wherein the first part-body of the magnetic core is arranged as an U core with the leg, which is arranged in the first cavity of the winding former, and the second part-body of the magnetic core is formed as an I core; and a protective body with a covering element configured to protect the at least one electrical conductor, wherein the coil former is fastened to the protective body and the at least one electrical conductor is covered by the covering element, wherein the coil former and the protective body are arranged such that the winding former is fastened in a self-sealing manner to the protective body so that any leaking of the potting material from a second cavity between the at least one electrical conductor and the covering element of the protective body is prevented, wherein the covering element comprises a bottom part, which lies opposite the at least one electrical conductor, and respectively on both sides of the bottom part a side part, wherein the winding former has flanges for delimiting a winding region, wherein either the flanges have in each case a recess and the side parts have in each case a web or the flanges have in each case the web and the side parts have in each case the recess, wherein the recess is a channel, and wherein the coil former is fastened to the protective body, in that each of the webs engages in one of the recesses.

2. The inductive component according to claim 1, wherein the potting material is in contact with the winding former.

3. The inductive component according to claim 1, wherein the second cavity is at least partially filled by the potting material, and wherein the second cavity is arranged between the at least one electrical conductor and the covering element.

4. The inductive component according to claim 1, wherein the winding region is wound with the at least one electrical conductor, and wherein the winding former further comprises a fastening region for fastening the coil former to the protective body, and wherein the fastening region is arranged laterally of the winding region.

5. The inductive component according to claim 4, wherein the fastening region and the protective body are shaped such that a tongue-and-groove connection for fastening the coil former to the winding former is formed between the fastening region and the protective body.

6. The inductive component according to claim 1, f wherein the coil former has at least one contacting region for contacting the at least one electrical conductor, wherein the protective body has at least one receiving region for receiving the at least one contacting region, and wherein the coil former and the protective body are shaped in such a way that the at least one contacting region is arranged in the at least one receiving region of the protective body and is surrounded by the potting material.

7. An inductive component comprising:

at least one electrical conductor;

a coil former with a hollow-shaped winding former, on a surface of which the at least one electrical conductor is wound around the winding former;

a magnetic core arranged in a first cavity of the winding former;

a potting material, wherein the at least one electrical conductor is surrounded by the potting material, wherein the potting material has no directly adherent contact with the magnetic core, wherein the winding former comprises an inner part-body with a winding region for being wound with a first electrical conductor of the at least one electrical conductor and an outer part-body with a winding region for being wound with a second electrical conductor of the at least one electrical conductor, wherein the inner part-body comprises the first cavity for receiving the magnetic core, and wherein the outer part-body comprises a third cavity, in which the inner part-body is arranged; and a connection between the inner part-body and the outer part-body of the winding former comprising a tongue-and-groove connection in a region of flanges of the inner part-body and the outer part-body of the winding former, wherein a groove of the tongue-and-groove connection is a channel, wherein a fourth cavity between the first electrical conductor and the outer part-body is at least partially filled by the potting material, wherein the magnetic core is formed as a PQ core with an inner leg, which is arranged in the first cavity of the inner part-body of the coil former, and an outer leg, which at least partially surrounds the outer part-body of the coil former.

8. The inductive component according to claim 7, wherein the potting material is in contact with the winding former.

9. The inductive component according to claim 7, further comprising a protective body with a covering element configured to protect the at least one electrical conductor, wherein the coil former is fastened to the protective body and the at least one electrical conductor is covered by the covering element.

10. The inductive component according to claim 9, wherein the winding former has a winding region for being wound with the at least one electrical conductor and a fastening region for fastening the coil former to the protective body, and wherein the fastening region is arranged laterally of the winding region.

11. An inductive component comprising:

at least one electrical conductor;

a coil former with a hollow-shaped winding former, on a surface of which the at least one electrical conductor is wound around the winding former;

a magnetic core arranged in a first cavity of the winding former;

a potting material; and a protective body with a covering element configured to protect the at least one electrical conductor, wherein the at least one electrical conductor is surrounded by the potting material, wherein the potting material has no directly adherent contact with the magnetic core, wherein the magnetic core comprises a first part-body and a second part-body, which are connected to one another, wherein at least one of the first part-body or the second part-body of the magnetic core comprises a leg arranged in the first cavity of the winding former and at least one further leg arranged outside the first cavity of the winding former, wherein both the first part-body and the second part-body of the magnetic core are formed as a U core, wherein the coil former is fastened to the protective body and the at least one electrical conductor is covered by the covering element, wherein the winding former has a winding region for being wound with the at least one electrical conductor and a fastening region for fastening the coil former to the protective body, the fastening region arranged laterally of the winding region, wherein the fastening region and the protective body are shaped such that a tongue-and-groove connection for fastening the coil former to the winding former is formed between the fastening region and the protective body, and wherein a groove of the tongue-and-groove connection is a channel.

12. The inductive component according to claim 11, wherein the potting material is in contact with the winding former.

13. The inductive component according to claim 11, further comprising a second cavity, which is at least partially filled by the potting material, wherein the second cavity is arranged between the at least one electrical conductor and the covering element.

14. The inductive component according to claim 13, wherein the coil former and the protective body are arranged such that the winding former is fastened in a self-sealing manner to the protective body so that any leaking of the potting material from the second cavity between the at least one electrical conductor and the covering element of the protective body is prevented.

15. The inductive component according to claim 14, wherein the covering element comprises a bottom part, which lies opposite the at least one electrical conductor, and respectively on both sides of the bottom part a side part, wherein the winding former has flanges for delimiting the winding region, wherein either the flanges comprise in each case the groove and the side parts have in each case a web or the flanges have in each case the web and the side parts have in each case the groove, and wherein the coil former is fastened to the protective body, in that each of the webs engages in one of the grooves.

* * * * *